BINARY INFORMATION COMMUNICATION SYSTEM

Original Filed April 24, 1958 8 Sheets-Sheet 1

Aug. 22, 1961 R. J. ERTMAN ET AL 2,997,540

BINARY INFORMATION COMMUNICATION SYSTEM

Original Filed April 24, 1958 8 Sheets-Sheet 3

BINARY INFORMATION COMMUNICATION SYSTEM

Original Filed April 24, 1958 8 Sheets-Sheet 5

Aug. 22, 1961 R. J. ERTMAN ET AL 2,997,540

BINARY INFORMATION COMMUNICATION SYSTEM

Original Filed April 24, 1958 8 Sheets-Sheet 6

Aug. 22, 1961 R. J. ERTMAN ET AL 2,997,540

BINARY INFORMATION COMMUNICATION SYSTEM

Original Filed April 24, 1958 8 Sheets-Sheet 7

2,997,540

BINARY INFORMATION COMMUNICATION SYSTEM

Robert J. Ertman, Rochester, N.Y., Irving Sperling, Panorama City, Calif., and Watson F. Walker, Pittsford, N.Y., assignors to General Dynamics Corporation, Rochester, N.Y., a corporation of Delaware Continuation of application Ser. No. 730,566, Apr. 24, 1958. This application Aug. 31, 1960, Ser. No. 53,308
20 Claims. (Cl. 178—23)

This application is a continuation-in-full of the copending application, Serial No. 730,566, filed April 24, 1958, now abandoned, similarly entitled, and assigned to the assignee of this application.

This invention relates to binary information communication systems and is particularly directed to transmitter-receiver systems in which a message or a plurality of messages may be written, or set, into binary coded storage devices, such as switches, and the messages rapidly serially read out and transmitted to a distant point where they are decoded, converted from serial to parallel form, and printed out.

The characters of printing telegraphic communication systems, including letters, numbers, and other meaningful symbols, generally comprises coded combinations of binary bits of information. Each bit comprises a pulse-type signal of a standardized length and of two distinct characteristics, such as two tone frequencies or two amplitudes. Coded binary characters are reliable and easy to process in electronic equipment inasmuch as equipment, such as flip-flops, are inherently stable in two distinct states in a manner similar to the ordinary overcenter snap switch. Unfortunately, the two-level signal bit is particularly vulnerable to extraneous noise pulses which may find their way into the communications channel at any point between the transmitter and receiver, whether the communications link is wire line or radio. Decoding equipment usually cannot distinguish between a wanted signal pulse and an unwanted noise pulse.

Accordingly, an object of this invention is to provide an improved binary information communications system which reliably transmits binary information even in the presence of extraneous noise pulses.

It has been recognized that it is important to detect an error caused by extraneous noise pulses and to print out the error rather than to print out an unlabeled erroneous character. Error detecting code systems, such as disclosed in Potts Patent No. 2,512,038, has suggested the double transmission of each bit of a coded message, the second transmitted bit being inverted with respect to the first. To operate the readout mechanism at the receiving end, two pairs of contacts of electromechanical relays must indicate opposite states for each bit, else an error is indicated. Unfortunately, the Potts type system employs large numbers of electromechanical relays and is quite heavy and complex, and is limited in speed of operation by the moving parts of the relays.

Accordingly, a further object of this invention is to provide an improved binary information communications system which is completely passive as far as mechanically movable parts are concerned, and is light in weight, simple in construction, and limited in speed of message transmission only by the bandpass characteristics of the communications channel.

The objects of this invention are obtained by setting the message to be transmitted into storage so that the characters of the message exist in parallel form before transmission starts. Each character comprises several bits of binary information, five bits per character being chosen here. Means are provided for scanning twice all of the bits of each character before the next character is considered. The first transmission of five binary bits is stored in a first register at the receiver, and the second transmitted set of five binary bits is stored in a second register at the receiver, whereupon the two sets of five binary bits are simultaneously compared and, in case of exact matching in the five pairs of stored bits, the coded character is read out to a utilization circuit, such as a teleprinter. No moving parts are required according to this invention at either the transmitter or receiver other than the printing equipment mentioned and other than the character write-in storage devices at the transmitter. Accordingly, there is no limitation to the speed of transmission of the stored messages other than the printout equipment, if used.

Other features and objects of this invention will become apparent to those skilled in the art by referring to the preferred embodiments described in the following specification and shown in the accompanying drawings, in which.

Figure 1:
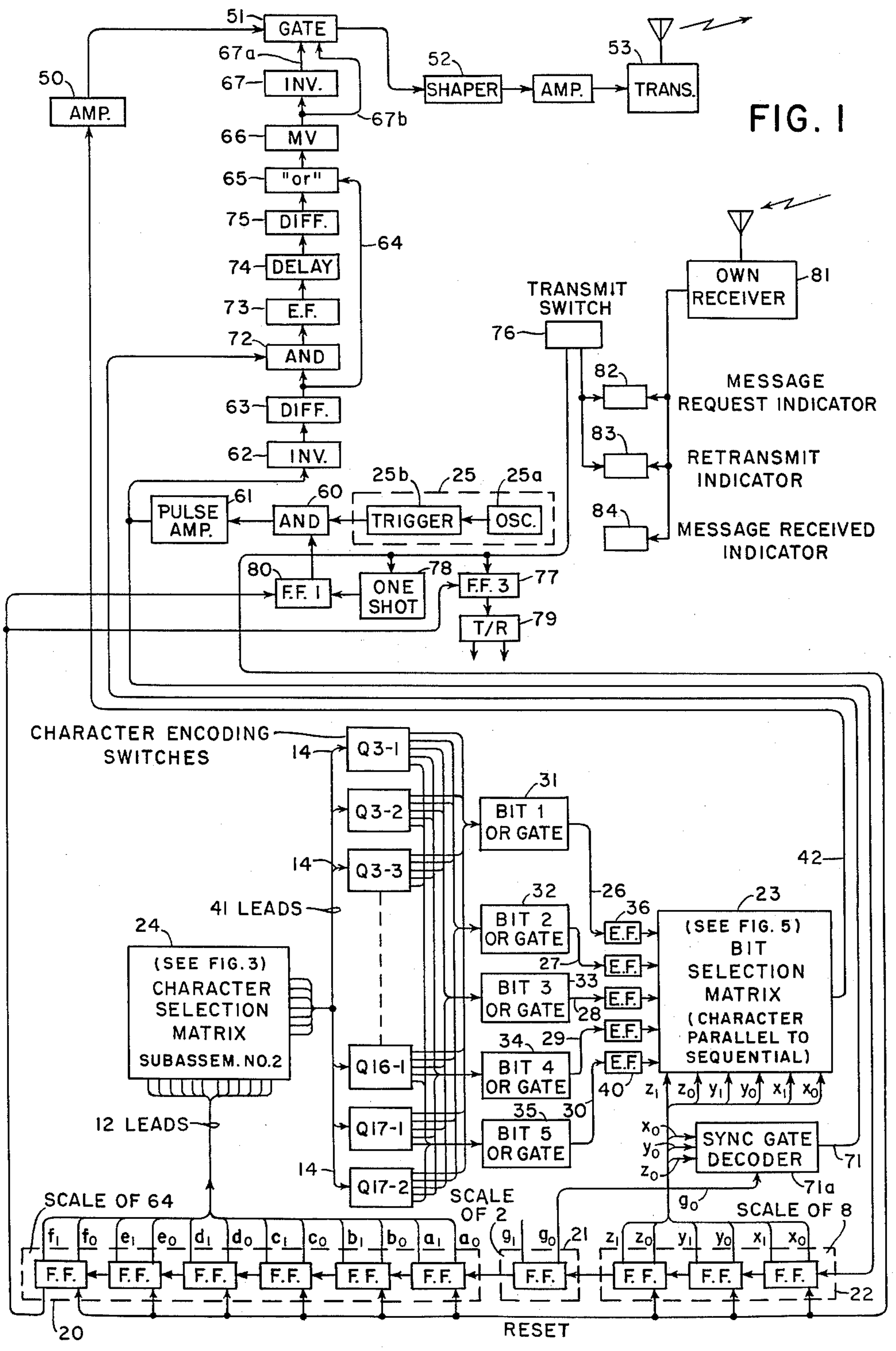
FIG. 1 is a block diagram of the transmitting station of the system of this invention.
Figure 5:
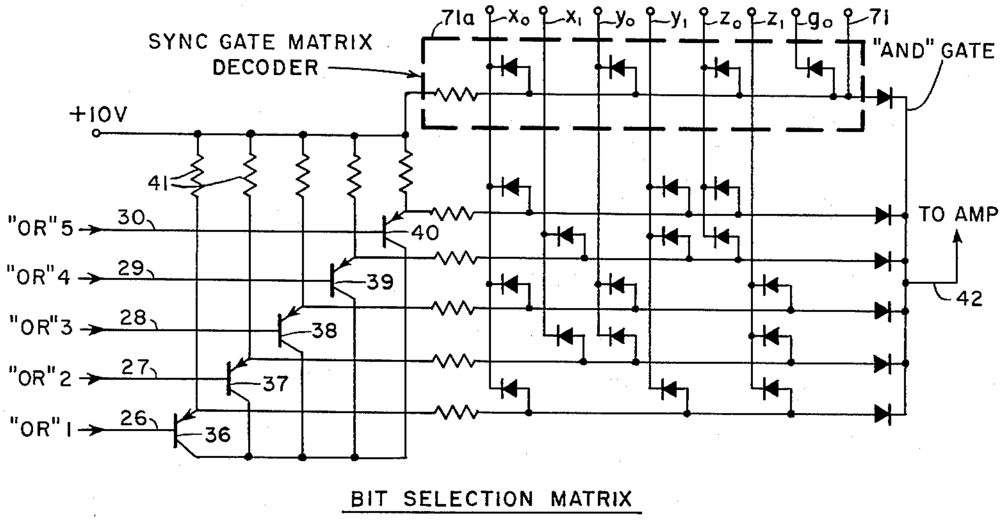
Figure 6:
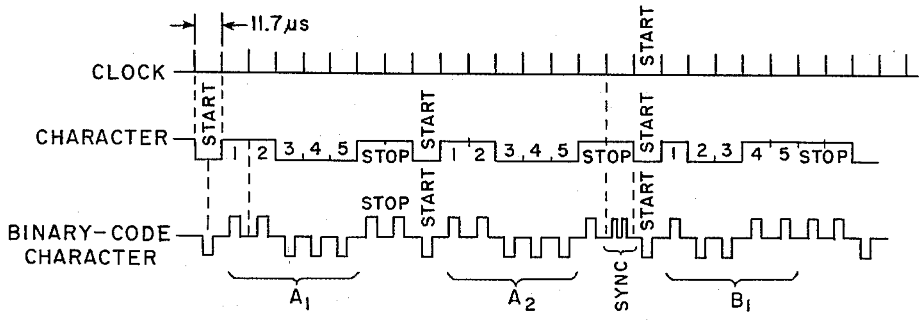
Figure 4:
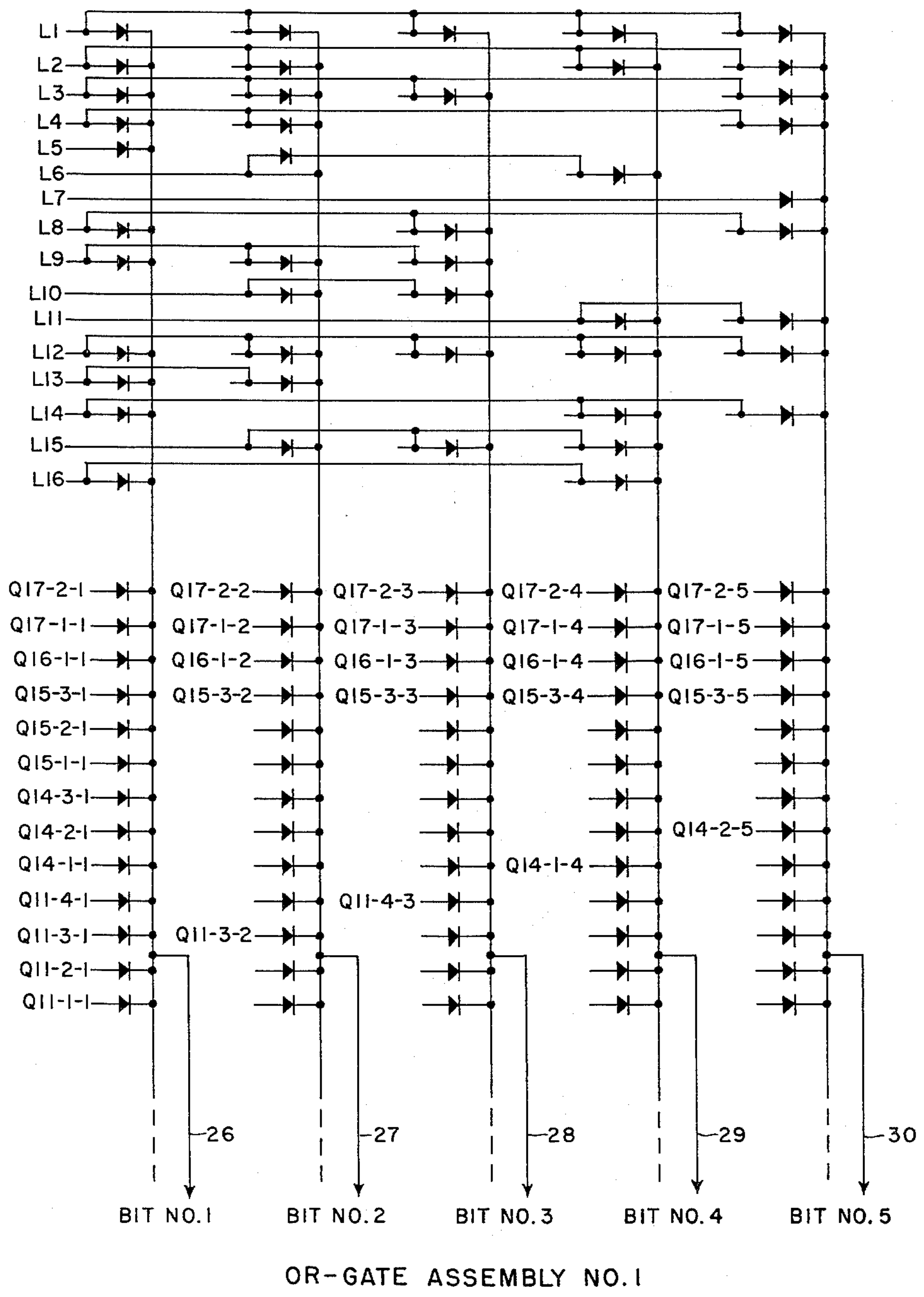
Figure 7A:
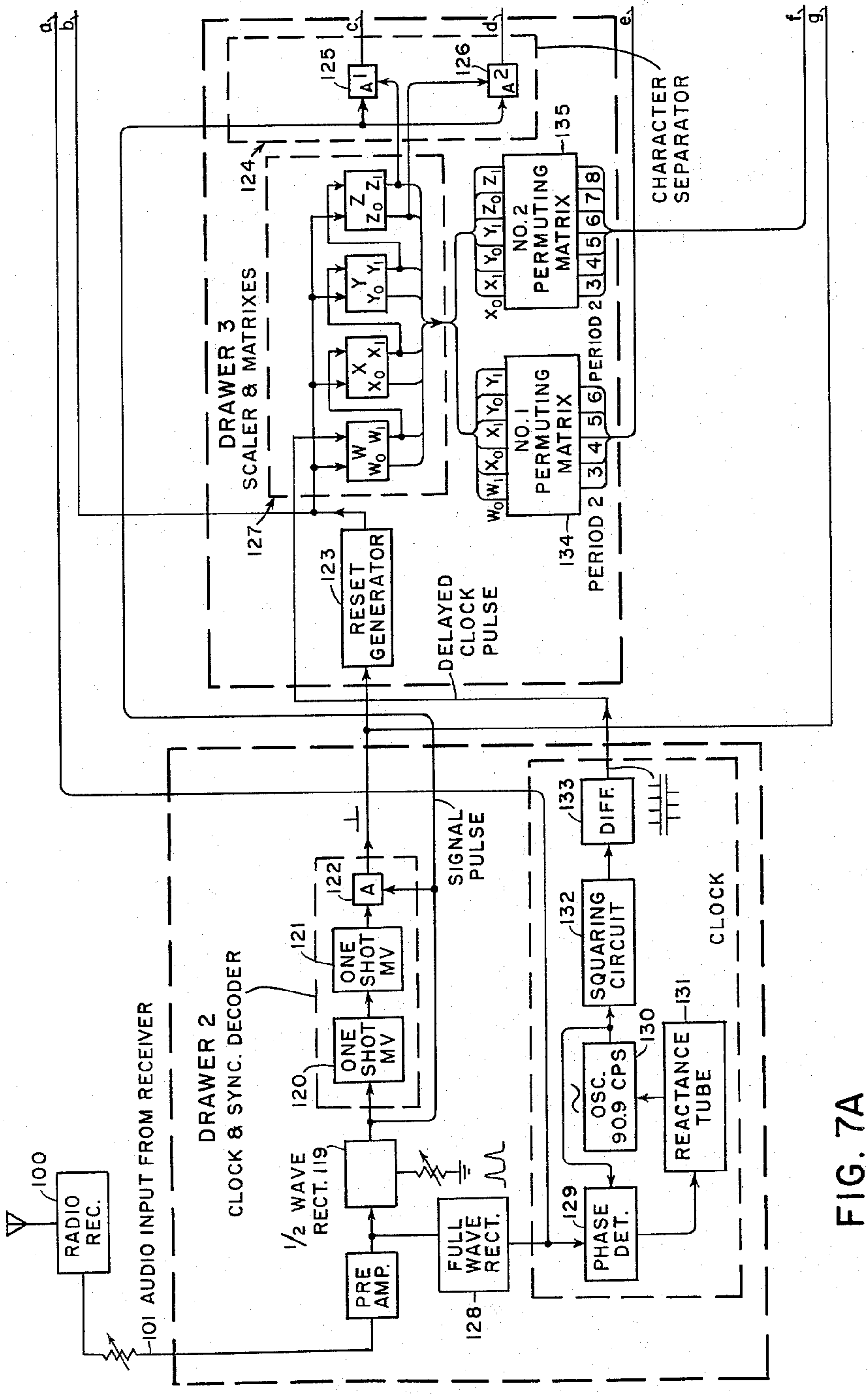
Figure 7B:
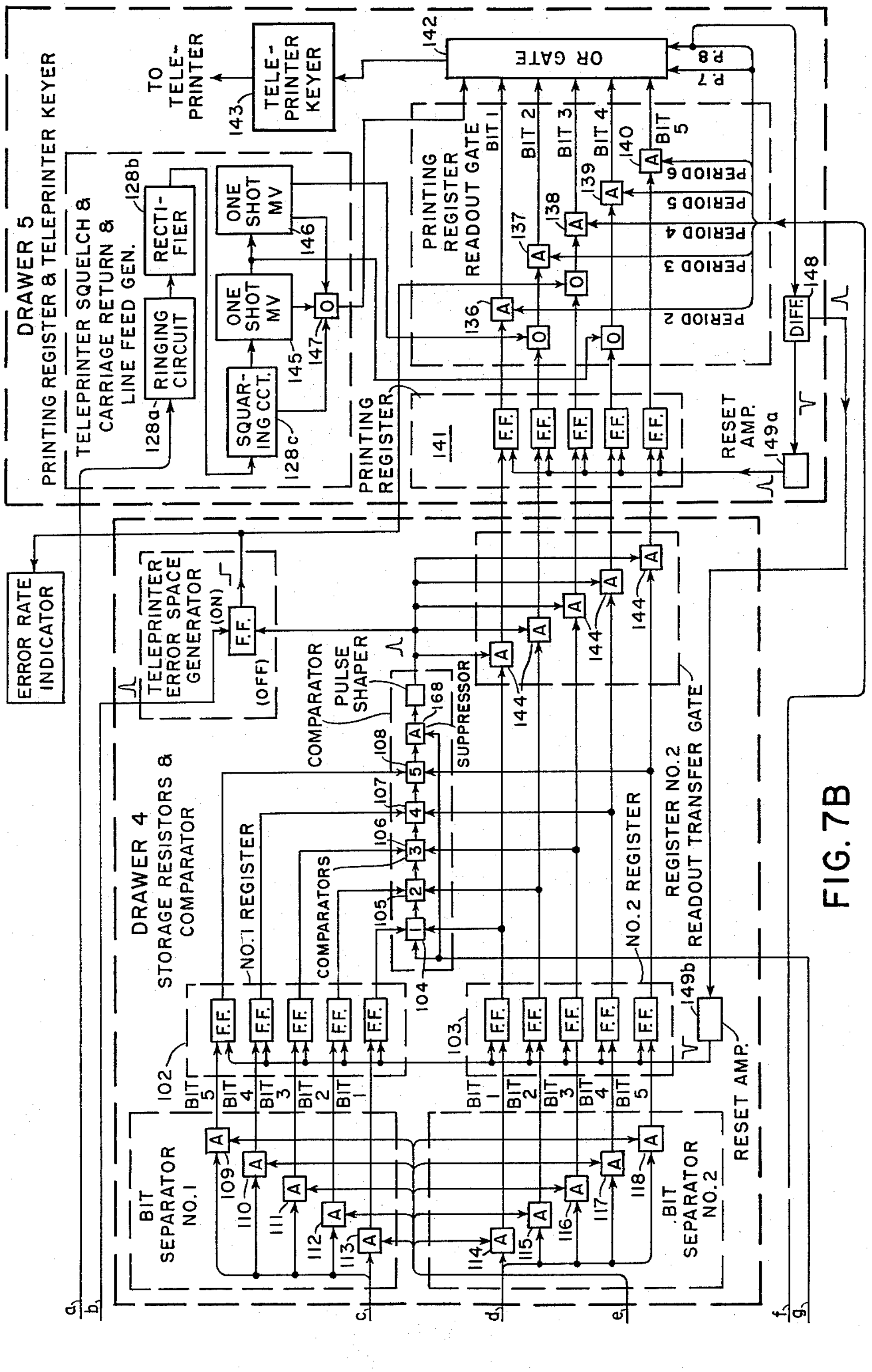
Figure 8:
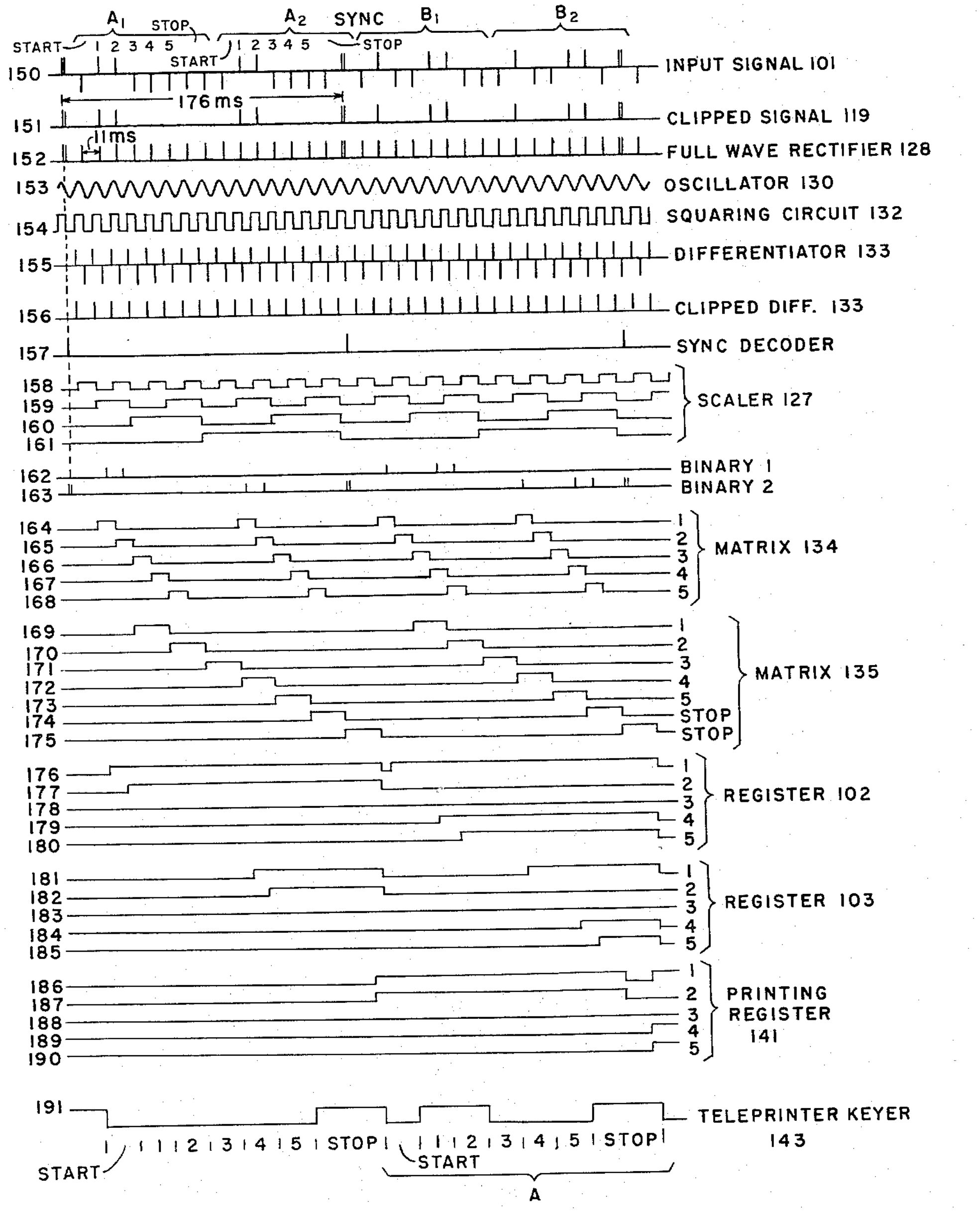
Figure 9:
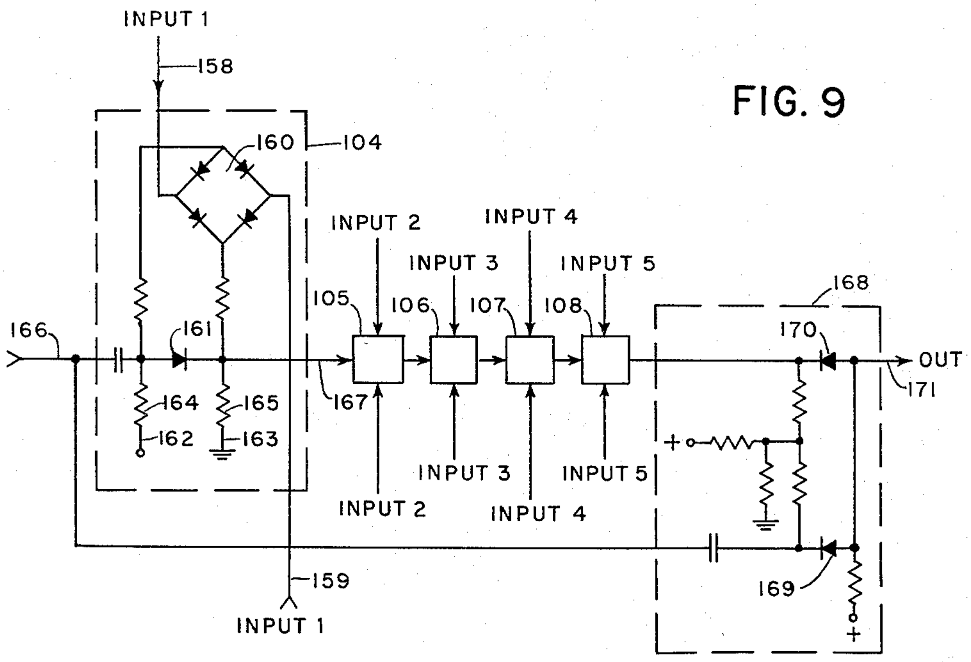
Figure 10:
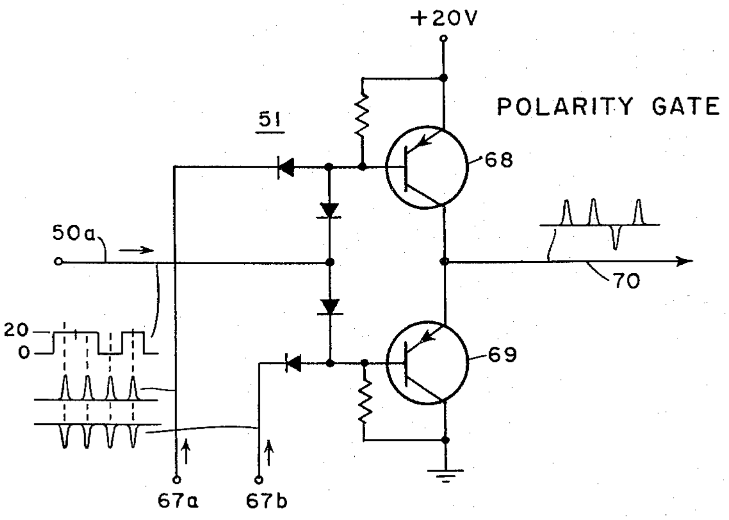

FIG. 4 discloses an OR gate subassembly of the type which may be used in the system of FIG. 1;

FIG. 5 shows a circuit for a bit selection matrix of the transmitter of FIG. 1;

FIG. 6 shows waveforms of important voltages in the output circuit of the transmitter of FIG 1;

FIGS. 7A and 7B together is a block diagram of the receiving station of the system of this invention;

FIG. 8 is a set of waveforms of the important voltages of the receiver of FIGS. 7A and 7B;

FIG. 9 is a circuit diagram of the interrogating circuit and comparators of FIG. 7B; and FIG. 10 is a circuit diagram of the polarity gate in the transmitter of FIG. 1.

In FIG. 1 is shown a series of character encoding switches designated by the prefixes "Q," each switch being of a type which will encode, by a binary code, a character such as letters of the alphabet or any of ten numerals. It is contemplated here that each character encoding switch be capable of storing one complete character and that the switches be grouped so that a meaningful message or "word" can be composed with the series of characters. The message, for example, could comprise numbers only, the numbers being assigned significance by prearrangement at the transmitting and receiving stations. For example, the character groups read in, or set in, at the transmitter could indicate the identity of an airplane, its altitude, its longitude and latitude, air speed, etc. The need and use of such stereotyped information is found in many stations, such as outlying substations, which must periodically report to a central or control station. In FIG. 1, the character encoding switches comprise groups labeled Q3 to Q17, inclusive; each group composing a "word" and each word comprising one, two, three, or more characters, indicated in FIG. 1 and throughout the drawings by suffixes -1, -2, etc.

Figure 2:
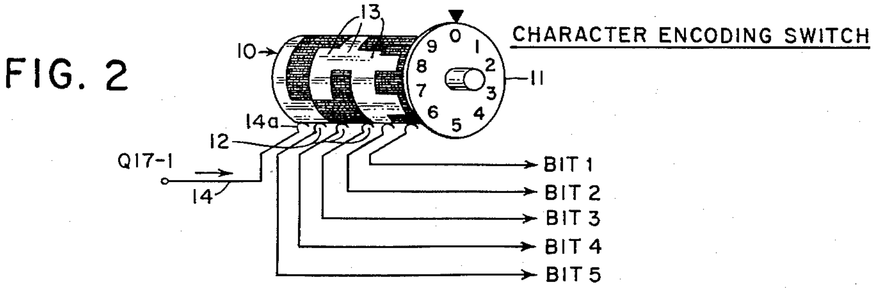
FIG. 2 shows in perspective one write-in character storage switch of this invention.

One character encoding switch is shown in FIG. 2, although the system hereinafter claimed is by no means limited to the specific mechanical details of this switch. The switch shown comprises the drum 10 mounted on a shaft with the dial 11. The dial and drum are rotatable to bring the character indicia selectively into registry with a pointer, or a window through which the operator can read one character at a time. Conventional detent mechanism (not shown) will hold the drum in preselected positions and will bring the wiper contacts 12 into contact with conducting area 13 on the surface of the drum. All of the conducting areas are electrically connected to the common or ground wiper 14*a*. The conducting areas are arranged in five circumferential rows on the drum so that the potential of the common wiper 14*a* and its common conductor 14 is selectively applied, or not applied, to the five wipers 12 and their output lead wires for each detent position of the dial. Accordingly, rotation of the dial 11 to a selected character position results immediately in a five bit coded message stored in parallel on the five output leads. Such parallel storage and write-in mechanism could obviously be effected in many alternative structures. By scanning the five leads, commutator fashion, the parallel stored bits may be serially read out.

The several character encoding switches, indicated at Q3–1 to Q17–2 in FIG. 1, each has its separate common lead 14. According to an important feature of this invention, the commons 14 are successively energized so that the information of each character encoding switch can be read out one at a time. By assuring that only one character switch is energized at a time, there can be no confusion of the bits of the character of one switch by the bits from any of the other switches. In the specific example to be hereafter described, the number of character encoding switches will be forty-one, and this number will be referred to from time to time for convenience of the description, although forty-one has no particular significance in the philosophy of the system.

Figure 3:
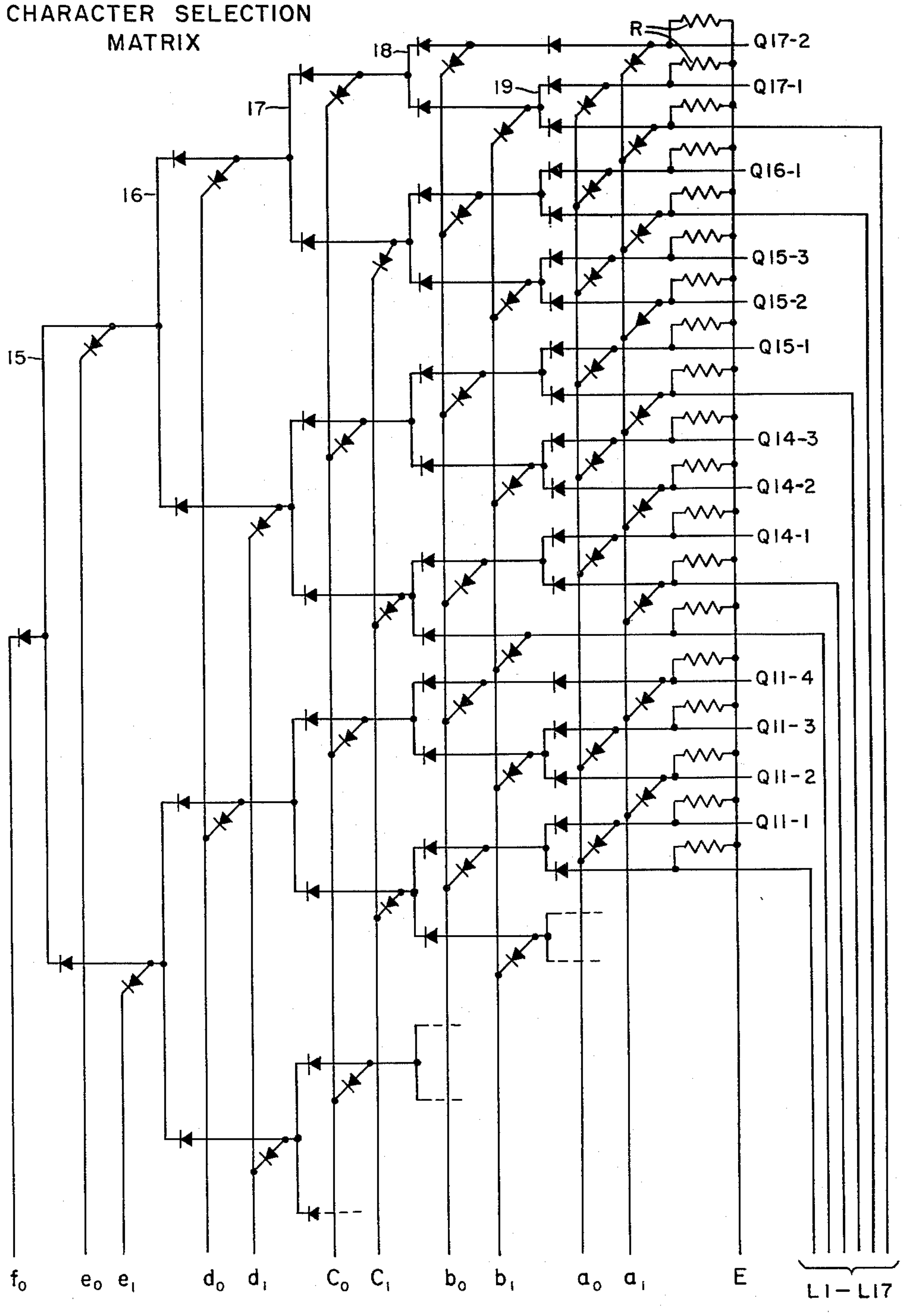
FIG. 3 is a schematic circuit diagram of one character selection subassembly employed in the transmitter of FIG. 1.

The forty-one leads are successively energized by a novel commutation system embodying the character selection matrix 24, one example of which is shown in detail in FIG. 3, and the binary divider or scaler indicated at 20 in FIG. 1. The binary divider 20 in the example comprises a plurality of cascaded bi-stable flip-flops coupled at one end to divider 21, which in turn is coupled to divider or scaler 22. Divider 20 has six flip-flop stages and hence a scale-of-sixty-four. Divider 21 has a scale-of-two, and divider 22 has a scale-of-eight. Divider 22 controls other timed functions in the system as will presently appear. The dividers shown scale down a clock pulse applied at the input or right-hand end of the divider 22, the clock pulse being derived from the regulated pulse generator 25. The dividers each comprise flip-flop stages, each stage dividing the count by two in conventional manner. The twelve leads from the six stages of divider 20 or indicated by $a_1$, $a_0$, $b_1$, $b_0$, $c_1$, $c_0$, $d_1$, $d_0$, $e_1$, $e_0$, $f_1$, and $f_0$. Each flip-flop may comprise a pair of triodes conventionally cross-connected between grids and anodes so that one tube is held non-conducting while the other is conducting. Transistors may be used if desired. The two grids, or bases, are coupled in parallel through diodes to the adjacent flip-flop so that the application of a pulse to the grids will cause reversal of the stable state regardless of the previous state. The two anodes of a flip-flop are, respectively, "high" and "low" in voltage, and are arbitrarily designated by "1" and "0" in the subscripts of leads *a*, *b*, *c*, etc.

The twelve leads $a_0$, $a_1$, $b_0$, $b_1$, etc., are applied to the character selection matrix 24 partially shown in FIG. 3, the most significant of the stages, $f_1$, $f_0$, being applied to the base or larger branches 15, 16 of the "tree"-type diode matrix, and the successively less significant stages being applied to the successively smaller branches 17, 18, 19 of the "tree." Because of space limitations in FIG. 3, $f_1$ and its branches are not shown. By dividing each branch two ways, as shown, and connecting each flip-flop lead to alternate branch junctions, and energizing the ultimate branches with a positive voltage, E, through load resistors R, these ultimate branches, labeled as "Q" leads, will successively swing positive at the highest clock rate applied to the binary divider. Output leads Q17–2, Q17–1, Q16–1, etc., are successively energized, one lead only at a time being energized. If there are forty-one character encoding switches, as mentioned above, there will be forty-one "Q" leads, each lead being connected to the common of one of the encoding switches of corresponding Q number. The "L" leads, L1 to L17, FIG. 3, are energized in turn as indicated by their placement among the "Q" leads to divide the groups of characters into words. The "L" leads are connected into the OR gates, FIG. 4, to be described.

According to the next important feature of this invention, the binary divider 20, FIG. 1, which controls the rate of scanning of the commons of the character encoding switches, is driven by the one-stage divider 21 which in turn is driven by the three-stage divider 22. Divider 22 produces count-down pulses in a range which is an even multiple of the count-down range of divider 20. Since divider 21 has a scale-of-two, the count-down multiple is two. That is, the pulse rate of divider 22 is twice the rate of divider 20.

The divider 22 is employed in cooperation with the bit selection matrix 23 to control the scanning rate of the output leads of the character encoding switches and the divider 20 is employed in cooperation with the character selection matrix 24 to control the scanning rate of the character encoding switch commons. With the single stage divider 21 between dividers 20 and 22, the counting speed ratio of the two matrices is two-to-one. The entire binary divider, 20, 21, 22, is driven by the clock pulse generator 25 comprising, in this case, the oscillator 25*a* and the Schmitt-type trigger circuit 25*b*. The oscillator should be crystal-controlled or otherwise frequency stabilized. The frequency of the oscillator 25*a* in the particular system constructed and successfuly operated was 90.9 cycles per second which is twice the pulse or clock frequency of commercial printing telegraph systems. This clock frequency permits a transmission rate of about sixty average words per minute.

The five output leads of the character encoding switches (five bits per character is again assumed) are connected, respectively, to the five OR gates indicated at 31, 32, 33, 34 and 35 in FIG. 1, so that each OR gate has forty-one input leads from the five bit output leads of the forty-one switches. The OR gates may be of the conventional loaded diode-type, one example of which is shown in FIG. 4, where a voltage applied to any one of the input Q-leads will produce a distinct voltage on the single output lead 26, 27, 28, 29 or 30 of the OR gates. For convenience in reading FIG. 4, the Q-leads from the character encoding switches to the OR gates are identified first by the suffix 17, 16, 15, etc., to suggest the character switch; and then by –1, –2, –3, etc., to suggest the particular character of a "word," and finally by –1, –2, –3, –4, and –5 to indicate the bits of the character. Thus, Q17–1–3 is the third bit of the first character of a-two-character word contained in switches Q17–1 and Q17–2. Success has been had in such OR gates with diodes of the type commercially known as the Hughes No. 6007 (IN458). Since one common only of the character encoding switches is energized at a time, only five of the total of the switch output leads can be energized and, hence, only five of the diodes in the five OR gates can be energized at one time. This reduces current drain to a minimum even where the OR gates must serve large numbers of input leads, as in the example here described.

To group the characters of the encoding switches into "words," the leads $L_1$ to $L_{18}$ are extended from the character selection matrix, FIG. 3, to the OR gates, FIG. 4. For example, after the "word" made up of two characters in switch Q17–2 and Q17–1 has been read out by successive activations of the leads Q17–2 and Q17–1, FIG. 3, then lead L17 is energized, which lead in turn applies an input potential to selected OR gates, FIG. 4, to encode a distinct and readable message which at the receiver is interpreted to mean the Q17 word is ended. In the example of FIG. 4, the L16 lead causes a distinctive bit readout, which in this case is an output on leads 26 and 29 of the first and fourth OR gates.

The bit selection mtarix, shown in general at 23 in FIG. 1 and in greater detail in FIG. 5, may comprise the loaded diodes in a cross-bar system similar in operation to the "tree" matrix of FIG. 3. The purpose of the matrix is to scan the outputs 26 to 30 of the five OR gates and to serially readout the bit information found stored in parallel in these leads. This scanning rate is determined by divider 22, the counting rate of which is twice the counting rate of divider 20, it will be remembered. This permits two complete readouts of the bit information of each character during energization of any one character encoding switch. In FIG. 5, the five OR gate leads 26 to 30 are applied, respectively, to the bases of emitter-follower transistors 36 to 40. The emitter load resistors 41 are connected, respectively, to the emitters; and the emitter junctions are connected to the horizontal bars of the matrix as shown. To the vertical bars of the matrix are connected the six timing leads $x_0$, $x_1$, $y_0$, $y_1$, $z_0$, $z_1$ from the binary divider 22, FIG. 1. The matrix operates on the principle of the AND gate, and the various horizontal and vertical bars are connected through diodes, the logic of the matrix being that only when all the diodes connected to any horizontal bar are non-conducting will a binary pulse pass through to the output 42.

The output 42 of the matrix successively carries the pulse current representative of the scanned five bit information. This serial information is amplified and shaped in amplifier 50, FIG. 1, and after passing through the polarity gate 51 is again shaped at 52 and applied to an outgoing transmission line or to the radio transmitter 53. Unfortunately, the pass band characteristics of most communications channels is limited. In an ordinary communications transmitter the pass band may be limited to 3,000 cycles per second, while the binary square-cornered pulses, of a type shown in FIG. 6, the required bandpass may be many times three thousand. According to an important feature of this invention, gate 51, more fully hereinafter to be described, converts the rectangular binary pulse information to rounded positive or positive and negative pulses.

It will be noted now that the bit selection matrix is timed by the higher speed, less significant, stages of the binary divider 22, and that the character selection matrix is timed by the lower speed, more significant, stages of the divider 20. With the scale-of-two divider 21 coupled between dividers 22 and 20, the bit selection matrix clock speed is exactly twice the character selection matrix speed. This means that the five OR gates, of the five bits, can be scanned twice during the interval any one of the commons of the encoding switches is energized.

Since the scale-of-eight binary divider 22 is capable of accurately measuring eight clock intervals, and since five clock intervals only are required for the coded binary message, there are three clock intervals left over. It has been found convenient to use two of these three intervals for transmitting a "stop" signal and for using the other interval for transmitting a "start" signal. The time relations of clock intervals, character content of the Q switches, and the transmitted binary pulses are shown in FIG. 6. Five binary bits, one start pulse and two stop pulses are indicated. In the example, the character "A" is transmitted twice before "B" is transmitted.

The operation of the polarity gate for transmitting the positive and negative rounded versions of the binary information as well as injecting clock synchronizing pulses for use at the receiver will now be described.

*Polarity gate*

The output of the local oscillator 25, FIG. 1, including any desired type of sinusoidal or other generator 25*a* followed by the multivibrator 25*b*, is amplified and applied to one of the inputs of AND gate 60. The other input of AND gate 60 will not permit passage of the local oscillations to pulse amplifier 61 until the transmitter has been conditioned by resetting all of its flip-flops and readying the encoding switches for readout, as will be referred to more fully below. That is, AND gate 60 is open only during readout of the encoding switches and actual transmission. The pulses are inverted at 62 and are differentiated at 63 so that positive- and negative-going spikes occur at the leading and trailing edges, respectively, of the rectangular output of multivibrator 25*b*. Throughout the normal transmission of the sixteen clock periods during the double transmission of each character, the output of the differentiator 63 is applied through conductor 64 to one input of OR gate 65. OR gate 65 controls multivibrator 66 which, in the system here considered, produces square pulses of about .5 millisecond duration. These .5 pulses are imposed upon the binary pulses of 11.7 milliseconds in gate 51 by inverter stage 67. Positive and negative excursions of each pulse of multivibrator 66 can simultaneously be applied to two inputs of gate 51.

Gate 51 is shown in detail in FIG. 10. According to a further feature of this invention, the gate 51 converts the binary information from the output of the bit selection matrix 23 and its amplifier 50, which binary information comprises two levels of square-cornered voltages, as shown in FIG. 10. That is, it is desired in the system contemplated here to convert the two voltage levels of the binary signals into, respectively, positive and negative pulses of relatively short duration and of rounded corners to pass the restricted bandpass of the conventional communications transmitters and receivers. In FIG. 10, the positive and negative spikes are applied at terminals 67*a* and 67*b*, while the binary output of amplifier 50 is introduced at terminal 50*a*. In this embodiment, the two transistors 68 and 69 are connected with their collectors and emitters in series between ground and a voltage source which is positive in this case. The two bases are connected to the positive and negative pulse terminals 67*a* and 67*b*, respectively, while the binary input is connected in parallel to the two bases, all inputs being through diodes, as shown. The alternate high and low voltages at 50*a* determines which transistor is made conducting, the opposite transistor being non-conducting. Accordingly, when the positive and negative spikes are simultaneously applied to 67*a* and 67*b*, only one spike of either the positive or negative polarity is passed through to the output 70, depending only upon whether the binary voltage is high or low. Hence, the gate 51 will select according to the binary waveform either the positive or the negative version of the pulse forming multivibrator output. The gate output is essentially of the waveform of the 67*a*—67*b* inputs and approximates the ultimate transmitted output of the system. Pulse shaping may be added, as at 52, FIG. 1, to conform the pulse to the bandwidth requirements of the transmitter, if required. The binary waveform of 0 and 20 volt levels, and the multivibrator waveforms, of about the same voltage, are shown in FIG. 10. The output pulses at 70 are positive-going and negative-going to clearly indicate the "mark" and "space" binary bits.

It is contemplated that a single polarity pulse may be desired for transmission. That is, either a positive-going or a negative-going pulse system may be used for marks, say, the space information being supplied by the synchronized clocks.

It has been found advantageous to transmit a clock synchronizing pulse to the receiving station once during each frame of 16 clock intervals. Conveniently, the sync pulses are transmitted at the end of each frame. Each frame comprises ten bits of information for the double transmission of five bits for each character, each transmission being accompanied by its one "start" and two "stop" pulses, as best illustrated in FIG. 6. It will be noted, now, that the binary dividers 22 and 21, FIG. 1, comprising a total of four flip-flops, and will produce a unique combination of high or low voltages every sixteenth clock count. This is uniquely utilized at the sync gate matrix decoder, shown generally at 71*a* in FIG. 1, one detailed embodiment being shown in FIG. 5. The outputs $x_0$, $y_0$, $z_0$ and $g_0$ of the dividers, FIG. 1, are all connected in an AND gate configuration, FIG. 5, so that an output pulse is produced on lead 71, FIGS. 1 and 5, every sixteenth clock interval. In FIG. 1, the output of the sync gate matrix decoder is applied to the AND gate 72 and hence every sixteenth clock pulse permits a differentiated pulse from 63 to pass through the AND gate 72 to the emitter-follower 73 and hence to the delay multivibrator 74. In the embodiment here described, the delay multivibrator 74 is adjusted to produce pulses of 2.75 milliseconds' duration. By differentiation at 75, two sharp pulses are produced 2.75 milliseconds apart which are applied to the second input of OR gate 65. In this manner, two pulses, spaced 2.75 milliseconds, are added to the input to polarity gate 51 during the last clock interval of the frame, which is during the second "stop" pulse in this example. At the receiver the unique double pulse is easily decoded and employed to control the local oscillator at the receiver.

In marginal conditions where considerable noise is present, it has been found there is danger of two noise pulses of sync pulse spacing occurring at times which are coincident in time with the true sync pulses and the decoder will erroneously alter the counter chain at the receiver and destroy an entire character. To obviate this condition, it may be found desirable to introduce not two sync pulses, as described above, but three or more sync pulses during a band interval. There is ample time during the single clock interval of 11.7 milliseconds, assumed above, to transmit as many as ten or more distinct sync pulses. The additional number of pulses for sync purposes can be introduced by an oscillator to drive the OR gate 65, FIG. 1, at the desired pulse rate.

*Operation of transmitter*

As the transmit switch 76 is closed, a pulse will be produced which operates flip-flop 77 and the one-shot multivibrator 78 and at the same time reset all the flip-flops in the binary dividers 20, 21 and 22.

The function of flip-flop 77 is to operate a transmit-receive relay 79 which will replace the microphone input to the transmitter 53 (not shown) with the binary system of FIG. 1; that is, the relay 79 functions much like the push-to-talk button on a microphone. At the same time, the relay 79 operates an indicator light that shows a binary message is being transmitted. One-shot 78 is intended to provide a delay at the beginning of the operating cycle to allow the transmitter to come up to full power, which delay may be several seconds. This one-shot operates flip-flop 80 so that at the end of such delay, AND gate 60 will allow the clock pulses to pass through to the divider 22. The readout operation of the whole system starts with the first clock pulse delivered to the binary divider 22. At the same time, the first clock pulse is applied through 62, 63, 64, 65, 66, 67 to the polarity gate 51. At the end of the double readout of all of the bits of all of the characters, the last flip-flop in the divider 20 changes its state producing a pulse which resets flip-flops 77 and 80 to their Off state. This means the transmit-receiver relay is opened, all further clock pulses are interrupted by AND gate 60, and the whole system is reduced to a stand-by condition for a new operation.

Often it is desirable to indicate to the operator of the transmitter system, of FIG. 1, to either start a new message transmission or to repeat the old. For this purpose, "own" receiver 81 may be provided with an audio output coupled to the message request indicator 82, to the re-transmit indicator 85, and to the message received indicator 84. Such indicators may conveniently be lights responsive through relays (not shown) to unique tone signals on a carrier received at 81. In response to the lights, the operator may condition his transmitter for operation and appropriately close the transmit switch, or turn off power to the transmitter.

Sometimes the audio characteristics of the equipment to be used are not as good as desired. That is, there is sometimes difficulty in recognizing polarity at the receiver after the message has been transmitted over a conventional radio communications link. It has been found that an improvement can be made by the use of positive pulses only, with the omission of negative-going pulses. Stated differently, improvement can be obtained by transmitting "marks" only and thus transmitting only pulses of one polarity whether they be positive- or negative-going. The synchronized clock at the receiver supplies the "spaces."

*Telegraphic receiver*

The radio receiver 100, FIG. 7A, is adapted to receive and demodulate the carrier from transmitter 53, FIG. 1. The audio output of the radio receiver 100 appears on lead 101. The output may be preamplified and, preferably, regulated as to voltage if the automatic volume control in the receiver is not sufficient. It is contemplated here that an ordinary communications receiver may be employed, and that the pulse shapes may be sacrificed as to squareness of form to accommodate themselves to the relatively narrow bandpass characteristics of the receiver. The character-by-character scanning and bit-by-bit scanning processes of the transmitter, FIG. 1, are performed in the reverse order in the receiver, of FIG. 7, by circuitry which will now be described. By placing FIGS. 7A and 7B end-to-end, the circuitry of the entire receiver can be viewed.

The first series of five binary bits are stored in the five bi-stable flip-flops of register 102, FIG. 7B. The second series of five binary bits of the same character are then received and stored in the five bi-stable flip-flops of register 103. At the completion of the second transmission, each pair of binary bits are compared in comparators 104, 105, 106, 107 and 108. Then, upon interrogation, the comparators must all respond alike in an error detecting circuit so designed that lack of coincidence of any of the bits in any of the five pairs will cause an error signal to be printed. In case there is exact similarity of all five bit pairs, the contents of one of the registers (103 in the case of FIG. 7B) is read out to a teleprinter. To further generalize, the inputs of each storage device of both registers are connected through AND gates 109 to 113 and 114 to 118, which AND gates are successively opened to permit the serially received bits of the radio receiver to travel into the proper storage flip-flops. The AND gates are successively opened at the fundamental clock frequency, whereas the readout of characters, from either register, is at the scanning frequency of the character encoding switches at the transmitter.

Referring to the details of FIG. 7A, it is seen that the incoming pulse information moves into three parallel circuits. The first circuit is the sync decoder comprising the half-wave rectifier or clipper 119 followed by two one-shot multivibrators 120 and 121 connected in series and the AND gate 122. The two input circuits of the AND gate 122 are connected, respectively, to the opposite ends of the two one-shot multivibrators. The delay periods of the one-shots are so regulated that the two synchronizing pulses, produced by 74 at the transmitter, FIG. 1, will appear in time coincidence at the two inputs to the AND gate 122. Then, and then only will the AND gate respond by passing a signal on to the reset generator 123 and to the comparator 104–108. The sync pulse passed by the AND gate 122 is at the end of a frame, and is applied to the comparator to interrogate the comparator and cause read-out or error indication. As mentioned before, if the two-pulse synchronizing signal does not seem sufficiently secure against false operation by random noise pulses, other and more complex sync pulses and decoding circuits may be employed.

The second circuit for the received signals, of FIG. 7A, comprises a by-pass around the decoder and connect directly to the character separator, 124. All of the incoming pulses are applied in parallel to one each of the two input circuits of the AND gates 125 and 126 of the character separator. One AND gate, 125 or 126, only, however, is opened at one time. As will appear below, AND gate 125 is open during the first reception of five bits of one character, whereupon the other AND gate 126 is opened and the second transmission of five bits of the same character are passed. The first AND gate 125 controls the five AND gates 109 to 113 of the first register. The second AND gate 126 controls the five AND gates 114 to 118 of the second register. The switching between AND gates 125 and 126 is controlled by the last flip-flop stage, Z, of the scale-of-sixteen counter or binary divider 127 to be referred to in detail below.

The third circuit at the input of the receiver includes the full-wave rectifier 128 connected to the phase comparator or detector 129. The local sine wave oscillator 130 is preferably identical to the oscillator 25*a* at the transmitter. The output of oscillator 130 is connected to the other input of the phase comparator and the phase relation of the incoming pulse waves with the local sinusoidal waves are compared to produce a direct current, the amplitude of which is indicative of the phase drift of one wave with respect to the other, and the polarity of which is indicative of the direction of drift. The error signal thus obtained is applied to the reactance tube 131 which adjusts the frequency of the local oscillator 130 to exact synchronism with the incoming pulses. The output of the frequency regulated oscillator is then squared at 132 and differentiated at 133 so that the output of the differentiator appears at spikes of voltage of opposite polarity at the beginning and end, respectively, of each square wave. Since the null or crossover of the sine wave of oscillator 130 can be adjusted to the time of occurrence of the received pulses (see lines 152 and 153 of FIG. 8), the differentiated output of 133 occurs one-half clock period after the beginning of the clock period. This time delay is found to be most convenient in operating the binary divider 127 now to be described.

The binary divider 127, FIG. 7A, corresponds in function with the dividers 22 and 21 of the transmitter, FIG.1. The divider may best be considered as comprising three cascaded flip-flops, W, X and Y, as in the case of divider 22, followed by the scale-of-two counter Z The flip-flops may be conventional in construction, one output of one flip-flop being connected to the input of the next flip-flop of the series. The application of a pulse to the input will cause the flip-flop to reverse its stable state regardless of its previous state. It will be noted now that the count-down rate of flip-flops W, X and Y is exactly twice the count-down rate of flip-flops X, Y and Z. The outputs of flip-flops W, X and Y are applied to the permuting matrix 134, while the outputs of flip-flops X, Y and Z are applied to the permuting matrix 135. The two permuting matrices may be similar, if desired, with either the bit selection or character selection matrices of FIG. 1. That is, by applying the count-down pulses $W_0$, $W_1$, $X_0$, $X_1$, $Y_0$, $Y_1$ to the inputs of matrix 134, there appears at the five output circuits five successive pulses at the clock rate. These five successive pulses are applied, respectively, over five conductors to the inputs of the pairs of AND gates 113—114, 112—115, 111—116, 110—117, and 109—118 of the bit separators. The inputs $X_0$, $X_1$, $Y_0$, $Y_1$, $Z_0$, $Z_1$ can be made to produce successive pulses at the outputs of permutating matrix 135. It will be noted that the pulse rate of the second set of flip-flops is scaled down by two with respect to the rate of the first set. The matrix 135 has seven outputs to accommodate, in the example here considered, the five bits of intelligence plus two stop pulses. These outputs of matrix 135 are applied, respectively, to the five printing register readout gates 136, 137, 138, 139 and 140 and operate them in a manner to print out the stored character in printing register 141, the print-out being performed at the more leisurely rate permitted by the sixteen clock period of the redundancy check. Two of the outputs are applied to the OR gate 142 of the printing register and, hence, to the teleprinter keyer 143 for starting the keyer at the proper time in a character cycle.

The control circuits of the AND gates 125 and 126 of the character separator are connected respectively to the two outputs of the last flip-flop, Z, of the divider 127. Flip-flop Z operates at the end of the first transmission of the five bits of the character to close AND gate 125 and open AND gate 126. When the flip-flop reverses the AND gates, the second set of five binary bits passes into the record register 103.

*Operation of receiver*

The operation of the receiver of FIGS. 7A and 7B can best be considered in connection with the waveforms of FIG. 8. The time scales on all of the diagrams from 150 to 191 are identical, and the diagrams have been vertically aligned so that by projection the time relationships of the various voltages can be easily seen. At 150 is shown the arrangement of pulses for transmitting the letter "A" comprising two "marks" followed by three "spaces." The five information pulses are preceded by a single start pulse and are followed by double stop pulses. In the particular example shown here, the time interval for the two transmissions of a single character is one hundred seventy-six (176) milliseconds. This provides a clock time interval of eleven milliseconds for each of the sixteen intervals. After passing through the half-wave rectifier 119, only the positive-going pulses remain in the output of the rectifier, as shown on line 151. At the output of the full-wave rectifier 128, however, all of the positive- and negative-going pulses appear, as shown on line 152. At 153 is the sine wave of the local oscillator 130 which operates at 90.9 cycles per second to produce the eleven millisecond clock. The waves of 152 and 153 are compared in the phase detector 129 for obtaining the error voltage which adjusts the frequency of the oscillator. The sine wave is squared 154 in the squaring circuit 132. By passing the square wave through a transformer, or other differentiating circuit 133, pulses appear at the leading and trailing edges of each pulse, as shown at 155, FIG. 8. Then, by rectifying the output of the differentiator, a series of positive-going pulses only appear as at 156. It will be noted that the first positive-going clipped differentiated pulse is delayed one-half clock period after the synchronizing pulse, of lines 150.

The output of the decoder 120—122 of the synchronizing pulses is shown at 157, FIG. 8, the sync pulses occurring every sixteen clock periods. The sync pulses are applied to the reset generator 123, the time period of which is exact to reset all of the flip-flops at the end of the double transmission.

At 158, 159, 160 and 161 are shown the waveforms of the four scaler flip-flops W, X, Y and Z. The count rate of each flip-flop is exactly one-half the rate of the immediately preceding flip-flop in the cascaded series.

Lines 162 and 163, FIG. 8, together show all of the positive-going pulses at the input of the receiver and shown on line 150. Line 162 contains only the positive-going signal pulses of the first transmission, while line 163 contains only the positive-going pulses of the second transmission of the same character. The shift from one flip-flop 125 to the other, 126, of the character separator is effected by the fourth flip-flop, Z, of the binary divider. This fourth flip-flop operates only after eight clock periods and, hence, separates the two groups of eight pulses between the two AND gates of the character separator. As explained before, these two AND gates control the operation of the bit separators 109—113 and 114—118, which in turn admits the two groups of bit characters, respectively, to the two registers 102 and 103.

On lines 164 to 168, inclusive, of FIG. 8, appear the five successive pulses at the output of the permuting matrix 134 for controlling in succession the five pairs of AND gates 109—113 and 114—118 of the bit separators. Since the permuting matrix 135 is controlled by flip-flops, X, Y and Z, and are the next most significant stages of the counter, the output time periods of the matrix 135 is exactly one-half that of matrix No. 1. It is convenient, as above pointed out, that seven outputs of matrix 135 be chosen. These seven output voltages are shown at lines 169 to 175, inclusive, of FIG. 8.

In the voltage examples of FIG. 8, the letter "A" is assumed to be transmitted. In this case, "A" has been coded to be represented by two "marks" followed by three "spaces." On lines 176 and 177, it is seen that the first two storage devices of register 102 receive two "up" or positive pulses. "Marks" could, of course, be recorded as "low" or negative voltages, if desired. Lines 178, 179 and 180, however, remain unchanged during the transmissions of "A" because in the example shown "spaces" are represented by absence of pulse signals during the three clock intervals of the third, fourth, and fifth clock periods. The second transmission of the letter "A" is fed into the second register 103, and the first two storage devices receive pulse information, as shown on lines 181 and 182. It is to be noted that the second storage starts in time exactly eight pulse periods after the first transmission. Lines 183, 184 and 185 are the voltages in the third, fourth, and fifth storage devices of the second register.

After the five pairs of bits have been compared in comparators 104 to 108, and after exact coincidence has been indicated, the contents of one of the registers (the second) is transferred by opening the five AND gates 144 of the readout transfer register gate to five flip-flops of the printing register 141. From the printing register 141 the five bits are successively read out by AND gates 136—140 and through the OR gate 142 to the teleprinter keyer. The five AND gates 136—140 are successively opened by the permuting matrix 135. Since each character is transmitted twice, it will now be perceived that readout can consume twice the time period required for the transmission of a single character. Thus, the half-speed permuting matrix 135 may be employed to control the AND gates of the printing readout. The teleprinter keyer reads the voltages shown on line 191, FIG. 8.

The sync pulses transmitted during the stop interval, after each double transmission, is employed to interrogate the five comparators 104—108 to determine whether a spurious signal has been received. The synchronizing signal appears at the output of the AND gate 122 in the sync decoder in FIG. 7A, and is applied to the first flip-flop 104 of the comparator. According to an important feature of this invention, the five pairs of bits are compared in a completely electrified circuit without mechanically moving parts, thus eliminating considerable weight and removing any limitation on the speed of operation of the comparators. Further, there is no need for inverting one signal with respect to the other before comparison. One comparator circuit embodying this invention is shown in detail in FIG. 9.

*Comparator*

In FIG. 9, the two inputs 158 and 159 from a pair of flip-flops in registers 102 and 103 (FIG. 7) are fed to opposite ends of one diagonal of the diode bridge 160. If the voltage across this diagonal does not change, it will be remembered, the opposite diagonal voltage does not change, regardless of the amount or direction the voltages may drift. Accordingly, the bridge 160 of FIG. 9 is capable of detecting similarity of voltages whether they be high or low. Two "mark" signals or two "space" signals applied to the two inputs will produce no output on the other diagonal of the bridge. If, however, one input differs from the other, an output voltage is produced. The other diagonal is coupled across the diode 161 through which current normally flows from the power source at 162 to ground 163, through resistors 164 and 165. While diode 161 is conducting forward current, its resistance is low and an interrogating pulse appearing at terminal 166 will pass through to the output 167. If now a reverse voltage is applied to diode 161 from the bridge 160, conductivity reduces or ceases and the interrogating pulse at 166 cannot pass through. A number of comparators, five in this case, are connected so that the interrogating pulse moves serially through the diodes 161 of each comparator. In case of non-agreement in any of the pairs of bits, the interrogating pulse is interrupted and will not appear at the output of the last comparator. To suppress any output except when an interrogating pulse travels through the five comparators, the AND gate or suppressor 168 is connected in the output of the series of comparators with one of its inputs connected to the interrogating pulse input 166 of the series and the other input is connected to the last comparator 108. The particular AND gate shown comprises two diodes 169 and 170 which are normally conducting. A positive-going output will occur at terminal 171 only when both diodes 169 and 170 are simultaneously interrupted by back voltages applied, respectively, from both ends of the comparator series.

The teleprinter, or other mechanical readout mechanisms of the receiver, must be warned of the impending receipt of a signal to be decoded. After the receiver has been tuned in to the transmitter and after a clock pulse has been detected, of the nature shown on line 152 of FIG. 8, the teleprinter circuits must be turned "on." For this purpose, a ringing circuit is connected between the output of the full-wave rectifier 128, FIG. 7A, and the ringing circuit amplifier 128a, FIG. 7B. After rectification at 128b and squaring at 128c, the pulses are applied to two serially connected one-shot multivibrators 145 and 146. The squaring circuit and one-shot multivibrators are connected through the OR gate 147 to the input of the teleprinter keyer OR gate 142. Details of teleprinter circuits and their controls are known and need not be described here.

At the completion of the readout and printing of one character, the various flip-flops of the registers and storage devices must be reset preparatory to the receipt of the next character. In FIG. 7B, the last or eighth of the count-down pulses, shown on line 175 of FIG. 8, is differentiated at 148 and the resulting positive and negative spikes are applied to the reset amplifiers 149a and 149b. The output of the reset amplifiers is ample to insure that all of the flip-flops of the registers 102, 103, and 141 are positively reset and ready for the next character.

What is claimed is:

1. In a transmitter station of a communication system, message storage means including a plurality of message storage switches, each switch comprising a group of pairs of contacts, one contact of each pair of contacts of each group being connected together and to a common lead and each switch being capable of storing a multiple-bit binary-coded character; means for sucessively energizing the common leads of said switches, means for firstly scanning the bit content of the stored character of one energized switch to serially read out the bits of the character of said one energized switch, and means for secondly scanning and reading out the bit content of said one energized switch before the common lead of another switch is energized.

2. A plurality of multiposition character selection switches, each switch having a direct current input lead and a plurality of output leads, each output lead being energized or not by said input lead according to a predetermined switch position binary code; a character selection matrix coupled to said input leads for successively energizing said input leads; a plurality of OR gates, the inputs of each gate, respectively, being connected to like output leads of all of said switches; a bit selection matrix; a clock pulse source, a binary divider coupled to the clock pulse source for scaling down the clock count, said divider comprising a plurality of cascaded binary stages, a plurality of the less significant stages of said divider being coupled to said bit selection matrix for successively sampling the bit information of the OR gate outputs; and a plurality of the more significant stages of said divider being coupled to said character selection matrix to control the speed of successive energizations of said input leads at a rate which is a submultiple of the bit sampling rate.

3. In a telegraphic transmitter, switch means for storing a plurality of binary bit coded characters; a plurality of OR gates, each OR gate having one output lead and having input leads corresponding in number to the number of stored characters, and the OR gates corresponding in number to the number of bits per coded character, corresponding bits of each character being fed to one only of said OR gates, a bit selection matrix connected to each of said OR gate output leads, and a frequency-stabilized pulse source coupled to said matrix for successively scanning said output leads for converting the parallel bit information at the output leads of said OR gates to sequential bit information.

4. The telegraphic transmitter of claim 3 further comprising means responsive to said pulse source for sequentially energizing said switching means and applying one coded character at a time to said OR gates for readout.

5. In combination in a telegraphic transmitter of the class described, a plurality of binary coded character storage switches, a character selection matrix coupled to said switches for sequentially energizing said switches, a bit selection matrix for sequentially sampling and transmitting the bits of an energized switch; a clock pulse source, a binary divider with a plurality of cascaded scaling stages coupled to said clock pulse source, said character selection matrix and said bit selection matrix being responsive, respectively, to different stages of said divider so that the switches are energized at a rate which is a submultiple of the rate at which said bits are scanned so that each character is transmitted a plurality of times before the next character is transmitted.

6. The telegraphic transmitter as defined in claim 5 further comprising means responsive to an intermediate stage of said binary divider for transmitting a distinctive synchronizing signal after the multiple transmssion of each character.

7. A telegraphic system of the class described comprising a transmitter with means for transmitting a signal having a plurality of binary bits coded for each character, said means transmitting all of the binary bits of one character along with controlling pulses and then retransmitting all of said binary tits; and a receiver including means for individually storing the first transmitted plurality of binary bits, and means for individually storing the second transmitted plurality of binary bits, a plurality of comparators corresponding in number to the number of binary bits per character, the comparators being coupled, respectively, to two bit storage means of like bits, means for indicating dissimilarity of any pair of bits; and means for reading out the contents of one of the mentioned plural bit storage means.

8. In combination in a synchronous radio-telegraphic transmitter-receiver system, a transmitter comprising a plurality of storage devices, each storage device having means for storing each of a plurality of binary bits representative of a character, each storage device having an output lead for each binary bit, a clock pulse generator stabilized with a local oscillator, a binary divider comprising a plurality of cascaded flip-flops, the cascade being driven by said oscillator; a character selection matrix driven by some of said cascaded stages for successively electrically energizing each storage device; a plurality of OR gates, said OR gates corresponding in number to the number of binary bits in a character, each OR gate having a plurality of input leads and one output lead, each OR gate input lead being connected to all of the storage output leads of corresponding bits; a bit selection matrix coupled to said OR gate output leads, said bit selection matrix being driven by different stages of said divider to successively scan the OR gate output leads, the scanning rate of the bits being higher than the scanning rate of said character storage devices so that all bits of one character can be read out and transmitted a plurality of times during energization of a storage switch; a receiver for decoding the signals of said transmitter, said receiver comprising a plurality of registers, a plurality of flips-flops in each register; a second clock pulse generator stabilized with a local oscillator, a binary divider having a plurality of cascaded flip-flop stages driven by said generator; means responsive to some of the stages of said divider for routing serially received bits of one character transmission to different flip-flops of one register, means responsive to said divider for routing serially received bits of another character transmission to different flip-flops of another register, a comparator for comparing the bit content of corresponding flip-flops in each register, and means responsive to all comparators for reading and decoding characters represented by the bit content of one register.

9. In combination in a synchronous radio-telegraphic transmitter-receiver system, a transmitter comprising a plurality of storage devices, each storage device being capable of storing each of a plurality of binary bits representative of a character, each storage device having an output lead for each binary bit, a clock pulse generator stabilized with a local oscillator, a binary divider comprising a plurality of cascaded flip-flops, the cascade being driven by said generator; means responsive to said divider for successively electrically energizing each storage device; means responsive to said divider for successively scanning the bit output leads of said storage devices, the scanning rate of the bits being higher than the scanning rate of said character storage devices so that all bits of one character can be read out and transmitted a plurality of times during each energization of a storage device; a receiver for decoding the signals of said transmitter comprising a plurality of registers, a plurality of flip-flops in each register; a second clock pulse generator stabilized with a local oscillator, means responsive to received pulses for synchronizing the frequency of the local oscillators at the transmitter and receiver, a binary divider having a plurality of cascaded flip-flop stages driven by said generator; means responsive to some of the stages of said divider for routing serially received bits to different flip-flops of one register, means responsive to other stages of said generator for routing serially received bits to different flip-flops of another register, a comparator for comparing the bit content of corresponding flip-flops in each register, and means responsive to all comparators for reading and decoding characters represented by the bit content of one register.

10. In combination in a synchronous radio-telegraphic transmitter-receiver system, a transmitter comprising a plurality of storage devices, each storage device having means for storing each of a plurality of binary bits representative of a character, each storage device having an output lead for each binary bit, a clock pulse generator stabilized with a local oscillator, a binary divider comprising a plurality of cascaded flip-flops, the cascaded flip-flops being driven by said oscillator; a character selection matrix driven by some of said cascaded stages for successively electrically energizing each storage device; a plurality of OR gates, said OR gates corresponding in number to the number of binary bits in a character, each OR gate having a plurality of input leads and one output lead, each OR gate input lead being connected to all of the storage output leads of corresponding bits; a bit selection matrix coupled to said OR gate output leads, said bit selection matrix being driven by different stages of said divider to successively scan the OR gate output leads, the scanning rate of the bits being higher than the scanning rate of said character storage devices so that all bits of one character can be read out and transmitted a plurality of times for each energization of a storage switch; a sync-pulse generator for generating a distinctive series of pulses during one clock interval and means for transmitting the distinctive series at least once during the plural transmission of one character; a receiver for decoding the signals of said transmitter, said receiver comprising a plurality of registers, a plurality of flip-flops in each register; a second clock pulse generator stabilized with a local oscillator, means responsive to the received distinctive series of sync-pulses for controlling said oscillator, a binary divider having a plurality of cascaded flip-flop stages driven by said generator; means responsive to some of the stages of said generator for routing serially received bits to different flip-flops of one register, means responsive to other stages of said generator for routing serially received bits to different flip-flops of another register, a comparator for comparing the bit content of corresponding flip-flops in each register, and means responsive to all comparators for reading and decoding characters represented by the bit content of one register.

11. In combination in a synchronous radio telegraphic transmitter-receiver system, a transmitter comprising a plurality of storage devices, each storage device being capable of storing each of a plurality of binary bits representative of a character, means for transmitting each group of binary bits a plurality of times, the transmissions of the binary bits being measured by regular clock intervals, means for generating a distinctive group of pulses during one clock interval after plural transmission of one character group of bits; a receiver for decoding the binary coded characters comprising a separate register for each transmitted group, each register containing a bi-stable storage device for each binary bit of a group, a bit separator for each register comprising a plurality of AND gates, each AND gate having two input circuits and one output circuit, said output circuits being coupled, respectively, to said bi-stable storage devices; a local clock generator responsive to said binary bits for entraining at the incoming clock frequency, means for decoding said characteristic synchronizing group of pulses, a binary divider having a plurality of cascade flip-flops, said cascade being responsive to the local clock generator, a character separator comprising two AND gates responsive, respectively, at their input circuits to the last stage of said divider, the other inputs of the AND gates of said character separator being coupled to the input of said receiver so that one incoming group is routed to one register and the next succeeding incoming group is routed to another register, comparators for comparing the voltage content of pairs of corresponding storage devices in said two registers, and a readout device responsive to said comparators for reading the content of one of said registers.

12. In combination in a synchronous radio-telegraphic transmitter-receiver system, said transmitter comprising means for transmitting a character group of binary bits a plurality of times; and a receiver comprising a plurality of registers for storing each bit of each group transmission, a local clock generator responsive to the incoming bit frequency, a binary divider responsive to said generator, a permuting matrix responsive to said divider for generating successive clock pulses on different leads at clock frequency, an AND gate connected in the input circuit of each storage device of each register, said AND gates being successively opened by the successive pulses of said leads, and means for applying incoming binary information in parallel to said storage devices through said AND gates.

13. In combination in a synchronous radio-telegraphic receiver, means for decoding a distinctive group of synchronizing pulses received during one or more clock intervals, a local clock generator responsive to incoming binary information for entraining said generator, a binary divider responsive to said generator, a permuting matrix responsive to a plurality of the stages of said divider for producing on separate leads clock pulses, a character separator coupled to the last stage of said divider, a plurality of registers each containing bi-stable storage means for each binary bit, AND gates coupled to each storage device and responsive to said permuting matrix and to said character separator for admitting serially received binary bits to different storage devices of said registers, and means for comparing the contents of corresponding storage devices and means responsive to said comparators for indicating lack of correspondence of any pair of storage devices.

14. In the receiver defined in claim 13, a readout register comprising a plurality of readout storage devices coupled respectively to the storage devices of one of said registers, and means for transferring the contents of said one register to said secondary register when coincidence of all said comparators is indicated.

15. The receiver defined in claim 13 further comprising a printout register having a bi-stable storage device for each character bit, AND gates coupled between the storage devices of said one register and the storage devices of said printout register, said AND gates being responsive to the controlling circuit of said comparators for transferring the bit content from one register to the other.

16. In combination in a synchronous radio-telegraphic receiver comprising a clock pulse source, two storage registers, each register containing a bi-stable storage device for each bit received, means for successively filling the storage devices of one register, means for then successively filling the storage device of the other register; a third register with bit bi-stable storage means, a comparator coupled to said first and second registers for comparing the content of corresponding bi-stable storage devices of said first and second registers and for producing an output signal indicative of identity or lack of identity of register contents, means responsive to said output signal for transferring the content of one of said first mentioned registers to said third register, means for resetting all of the storage devices of said first and second registers, and means responsive to said clock pulse source for reading out the content of said third register, said readout being at one-half the clock speed.

17. A receiver for decoding binary coded characters, each character comprising a group of binary bits and each group of bits being received in succession a plurality of times, the receiver comprising a separate register for each transmitted group, and each register containing a bi-stable storage device for each binary bit of the characters, a bit separator for each register comprising AND gates with two input circuits each and with an output circuit, said output circuits being coupled, respectively, to said bi-stable storage devices; means for applying incoming binary information to one of said input circuits of each AND gate in one register, means for successively applying clock pulses to the other input circuits of the last mentioned AND gates, means for applying incoming binary information of a subsequent character transmission to one of said input circuits of each AND gate in another register, and means for successively applying clock pulses to the other input circuits of the last mentioned AND gates.

18. A polarity gate in a telegraphic transmitter, a source of approximately rectangular coded "mark" and "space" binary voltage signals of uniform duration and clock frequency, means for converting the "mark" and "space" singals, respectively, to positive-going and negative-going pulses from a median voltage value, said means comprising a source of simultaneous positive and negative pulses of clock frequency and of predetermined duration less than the clock interval, said source having two output leads for supplying, respectively, said positive-going and said negative-going pulses, two amplifier devices coupled side-by-side with the amplifier output circuits coupled in parallel to a common lead and the input circuits thereof being coupled, respectively, with said output leads of said source of simultaneous pulses, the source of binary signals being coupled in parallel to input circuits of said amplifiers.

19. In a transmitter station of a communication system, message storage means including a plurality of message storage switches, each switch comprising a group of contacts with a common contact, said common contact being connected to a common lead and each switch being capable of storing character information; means for successively enabling the common lead of each switch, means for firstly scanning the group of contacts of one enabled switch to serially read out the character information content of said one enabled switch, and means for secondly scanning and reading out the character information content of said one enabled switch before the common lead of another switch is enabled.

20. In combination in a telegraphic transmitter of the class described, a plurality of encoded character storage switches, each switch having a plurality of positions representative of individual predetermined groups of bits, a character selection matrix coupled to said switches for sequentially enabling said switches, a bit selection matrix for sequentially transmitting the bits representative of an enabled switch; a clock pulse source, a first and a second binary divider, said first and second binary dividers having, respectively, a plurality of cascaded scaling stages, said first binary divider being coupled to said clock pulse source, and said secondary binary divider being coupled to said first binary divider through means including a flip-flop, said character selection matrix and said bit seleciton matrix being coupled and responsive, respectively, to said second and first divider so that the switches are enabled at a rate which is a submultiple of the rate at which said bits are transmitted so that each character is transmitted a plurality of times before the next character is transmitted.

No references cited.